United States Patent
Matsuno et al.

(10) Patent No.: US 7,442,757 B2
(45) Date of Patent: Oct. 28, 2008

(54) RESIN, RESIN COMPOSITION, METHOD FOR MANUFACTURING THE SAME, AND MOLDED MATERIAL INCLUDING THE SAME

(75) Inventors: Tatsuya Matsuno, Kyoto (JP); Keijiro Takanishi, Ritto (JP)

(73) Assignee: Toray Industries, Inc., Tokyo (JP)

( * ) Notice: Subject to any disclaimer, the term of this patent is extended or adjusted under 35 U.S.C. 154(b) by 438 days.

(21) Appl. No.: 10/514,886

(22) PCT Filed: May 13, 2003

(86) PCT No.: PCT/JP03/05946

§ 371 (c)(1),
(2), (4) Date: Nov. 17, 2004

(87) PCT Pub. No.: WO03/097720

PCT Pub. Date: Nov. 27, 2003

(65) Prior Publication Data
US 2006/0047104 A1 Mar. 2, 2006

(30) Foreign Application Priority Data
May 20, 2002 (JP) ............................. 2002-144184

(51) Int. Cl.
*C08G 79/04* (2006.01)
(52) U.S. Cl. .................. 528/169; 528/167; 528/196; 528/398; 528/400
(58) Field of Classification Search .................. None
See application file for complete search history.

(56) References Cited

U.S. PATENT DOCUMENTS 3,053,878 A * 9/1962 Friedman et al. ............... 558/78
3,406,224 A * 10/1968 Mcdonough ................. 525/437
5,288,869 A * 2/1994 Giroldini et al. ............. 544/230
5,484,830 A * 1/1996 Staendeke ................... 524/101

FOREIGN PATENT DOCUMENTS

| JP | 58174439 | * 10/1983 |
| JP | 62141008 | * 6/1987 |
| JP | 2000290288 | * 10/2000 |

OTHER PUBLICATIONS

Parker, McGraw-Hill Dictionary of Chemical Terms; 1987; p. 328.*

* cited by examiner

*Primary Examiner*—David Buttner
(74) *Attorney, Agent, or Firm*—Kubovcik & Kubovcik

(57) ABSTRACT

A thermoplastic resin contains a polymer, and the polymer includes a divalent phosphate residue having a spiro ring, represented by formula (1), in a molecule and has a number average molecular weight of at least 2,000:

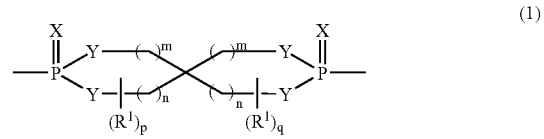

(1)

wherein $R^1$ is independently selected from the group consisting of a hydrogen atom, a halogen atom, an aliphatic hydrocarbon group having the carbon number of 1 to 20, an aromatic hydrocarbon group having the carbon number of 1 to 20, and a nitro group; p and q are integers satisfying p+q=0 to 16; X independently represents oxygen, sulfur, selenium, or an unshared electron pair; Y is independently selected from oxygen, sulfur, and a methylene group; and n and m are integers satisfying n+m=0 to 4.

12 Claims, No Drawings

RESIN, RESIN COMPOSITION, METHOD FOR MANUFACTURING THE SAME, AND MOLDED MATERIAL INCLUDING THE SAME

This application is a 371 of international application PCT/JP03/05946 filed May 13, 2003, which claims priority based on Japanese patent application No. 2002-144184 filed May 20, 2002.

TECHNICAL FIELD

The present invention relates to a thermoplastic resin having excellent heat resistance, optical properties, and mechanical properties, a method for manufacturing the same, and a molded material including the same.

BACKGROUND ART

Inorganic glass has excellent transparency and excellent properties, e.g., small optical anisotropy, and therefore, are used previously as a transparent material in wide fields. However, there are problems in that the inorganic glass is heavy and susceptible to damage, the productivity is poor, for example. Consequently, in recent years, transparent polymers as alternatives to the inorganic glass have been developed actively. For example, polymethyl methacrylates (PMMA) and polycarbonates (PC), which are transparent polymers and which have excellent transparency and mechanical properties as well as excellent workability and moldability, are used as molding materials in machines, automobiles, optical apparatuses, electric and electronic fields, and the like. However, known polymers do not have sufficient heat resistance. For example, although the glass transition point of the polycarbonate is 150° C., some optical materials in automobiles and in electric and electronic fields are required to have heat resistance up to 150° C. or more. Consequently, research has been actively conducted on highly heat-resistant polyarylates (PAR), polyether sulfones (PES), and the like. However, some have coloring problems due to elongation of conjugated systems since the content of aromatic groups is high, and there are problems in that, for example, birefringence is increased since optical anisotropy is generated during orientation. When only the optical property is taken into consideration, in general, the aliphatic series have small refractive indices and small main polarizability differences and, therefore, are superior to the aromatic series. However, when the aliphatic series are contained, the degree of freedom of main chain and side chain of the polymer is increased, the glass transition point is lowered and, therefore, the resulting polymers are unsatisfactory from the viewpoint of the heat resistance. In recent years, a cycloolefin polymer (COP) having an aliphatic ring structure has been developed actively. Examples of COPs include ZEONEX produced by ZEON Corporation and ARTON produced by JSR Corporation. These have the aliphatic ring structure and, therefore, the birefringence is reduced, and the glass transition points are relatively high 140° C. to 170° C. However, the method for polymerizing COP is a metathesis ring-opening polymerization method and an ethylene group is included in the main chain, so that this method is insufficient to achieve the object of producing a resin exhibiting a further high glass transition point.

The inventors of the present invention noted phosphorous-based polymers which had high heat resistance and excellent optical properties and which had a Spiro ring structure.

It is well known that the phosphate having a spiro ring is useful as a flame retardant of synthetic polymers, and considerable research have been conducted (for example, U.S. Pat. No. 3,090,799, U.S. Pat. No. 4,178,281, and Japanese Unexamined Patent Application Publication No. 60-133049). These documents describe monomers represented by the following General formula (5), for example, and compositions containing the monomers, and disclose that the monomers and the like exert a high effect of improving flame retardancy:

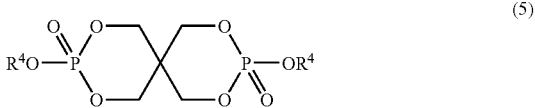

(5)

(Here, $R^4$ represents an alkyl group or an aryl group.).

However, in the documents, the monomers and the like are primarily used as only flame retardants, and the documents do not disclose that the monomers and the like are practically used for heat-resistant molded materials and optical purposes. The monomers and compositions having a phosphorous-containing spiro ring structure according to the above-described known technology cannot be produced as high molecular weight substances, and are unsuitable for optical uses because of being colored.

DISCLOSURE OF INVENTION

The object of the present invention is to provide a resin as a polymer having a phosphorous-containing spiro ring structure, wherein the resin is made to have a high molecular weight and is colored to a lesser extent in order to become applicable to uses for various molded materials.

The present invention has the following configuration in order to overcome the above-described problems. That is, the present invention primarily provides a resin containing a polymer which includes a divalent phosphate residue having a spiro ring, represented by the following General formula (1), in a molecule and which has a number average molecular weight of at least 2,000 and, in addition, provides various modified forms:

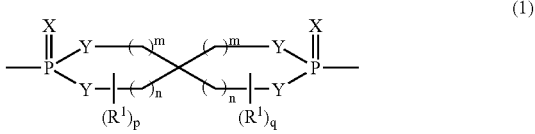

(1)

where, in General formula (1), $R^1$ is independently selected from the group consisting of a hydrogen atom, a halogen atom, an aliphatic hydrocarbon group having the carbon number of 1 to 20, an aromatic hydrocarbon group having the carbon number of 1 to 20, and a nitro group; p and q are integers satisfying $p+q=0$ to 16; X independently represents oxygen, sulfur, selenium, or an unshared electron pair; Y is independently selected from oxygen, sulfur, and a methylene group; and n and m are integers satisfying $n+m=0$ to 4.

BEST MODE FOR CARRYING OUT THE INVENTION

A resin of the present invention is configured to include a structural unit (residue) represented by the following General formula (1):

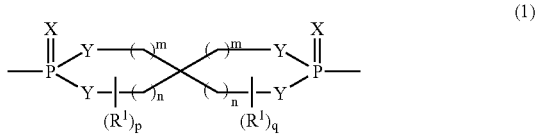

(1)

where, in General formula (1), $R^1$ is independently selected from the group consisting of a hydrogen atom, a halogen atom, an aliphatic hydrocarbon group having the carbon number of 1 to 20, an aromatic hydrocarbon group having the carbon number of 1 to 20, and a nitro group; p and q are integers satisfying p+q=0 to 16; X independently represents oxygen, sulfur, selenium, or an unshared electron pair; Y is independently selected from oxygen, sulfur, and a methylene group; and n and m are integers satisfying n+m=0 to 4.

With respect to the number of ring members of the divalent phosphate residue having a spiro ring, represented by the above-described General formula (1), four-membered to eight-membered rings are adopted. Preferably, a six-membered ring (that is, n+m=2) is adopted in consideration of the ring stability. It is particularly preferable that n=1, and m=1.

In the divalent phosphate residue having a spiro ring, represented by the above-described General formula (1), Y is selected from oxygen, sulfur, and a methylene group. Preferably, 3,9-dichloro-2,4,8,10-tetraoxa-3,9-diphosphaspiro [5.5]undecane-3,9-dioxide (hereafter may be referred to as SUPOC) synthesized from pentaerythritol and phosphorous oxychloride as starting materials, that is, a compound in which $R^1$ is a hydrogen atom and both X and Y are oxygen is adopted. The compound itself is publicly known substance, and a manufacturing method therefor is described in, for example, Journal of Organic Chemistry vol. 28, pages 1608-1612. That is, the compound is produced by reacting about 2 mol of phosphorous oxychloride relative to 1 mol of pentaerythritol. Phosphorous trichloride, thiophosphoryl chloride, phosphorous oxybromide, phosphorous tribromide, and the like can be used in place of phosphorous oxychloride.

In these divalent phosphate residue having a spiro ring, preferably, X contains an unshared electron pair since the oxidation resistance can be imparted to the resin. However, in consideration of the stability of properties, e.g., optical properties, the content thereof is preferably 50 percent by mole or less, more preferably is 25 percent by mole or less, and further preferably is 10 percent by mole or less.

The compounds and oligomers including the divalent phosphate residue having a spiro ring, represented by the above-described General formula (1), have been previously used primarily for flame retardants. Consequently, high molecular weight substance is not necessary, and coloring exerts no effect on the use for flame retardants. However, the polymer of the present invention has both mechanical properties sufficient for a molded material and a film and excellent optical properties.

The resin of the present invention include a divalent phosphate residue having a spiro ring, represented by the above-described General formula (1), in a molecule and the number average molecular weight of the resin is at least 2,000. When this range is satisfied, the mechanical properties sufficient for molded materials and films can be provided. Preferably, the number average molecular weight is at least 10,000. The upper limit is not specifically limited as long as problems do not occur in that the moldability and the fluidity are impaired. In general, preferably, 1,000,000 or less is adopted.

The molecular weight of the polymer of the present invention can be controlled by a method in which a monofunctional substance is added in the polymerization. Here, examples of monofunctional substances used as molecular weight adjustor include monohydric phenols, e.g., phenol, cresol, and p-tert-butylphenol; and monovalent acid chlorides, e.g., benzoyl chloride, methanesulfonyl chloride, and phenylchloroformate.

Preferably, the content of the above-described residue represented by General formula (1) is at least 0.5 percent by mole relative to the entire resin, further preferably is at least 5 percent by mole, and at least 10 percent by mole is particularly preferable. When other polymer component and the like are contained, preferably, the content of the above-described residue represented by General formula (1) is at least 0.5 percent by mole relative to the entire resin composition, further preferably is at least 5 percent by mole, and at least 10 percent by mole is particularly preferable. When other compounds are mixed so as to produce a resin composition, preferably, the content in the resin composition is controlled to become within the above-described range, and the resin composition is subjected to use.

Preferably, the resin of the present invention contains a diol residue represented by General formula (2):

(2)

where, in General formula (2), $R^2$ represents an alkylene group having the carbon number of 2 to 20, or an arylene group having the carbon number of 6 to 40, and the resin may contain different at least two types of $R^2$ selected from alkylene group(s) and/or arylene group(s).

Diols which provide the above-described residue are compounds which can be represented by a general formula HO—$R^2$—OH, where $R^2$ is a straight-chain or branched alkylene group having the carbon number of 2 to 20, preferably of 2 to 8, or an arylene group having the carbon number of 6 to 40. Specific examples of diols containing an alkylene group having the carbon number of 2 to 8 include ethylene glycol, diethylene glycol, triethylene glycol, 1,3-propanediol, 1,3-butanediol, 1,4-butanediol, 2-methyl-1,3-propanediol, 1,5-pentanediol, 2,4-pentanediol, 2,2-dimethyl-1,3-propanediol, 3-methyl-1,3-butanediol, 1,6-hexanediol, 2,5-hexanediol, 2-ethyl-2-methyl-1,3-propanediol, 2-methylpentane-2,4-diol, 3-methyl-1,5-pentanediol, 1,7-heptane diol, 2,2-diethyl-1,3-propanediol, 2,4-dimethyl-2,4-pentanediol, 1,8-octanediol, 2,5-dimethyl-2,5-hexanediol, 2-ethyl-1,3-hexanediol, 2,2,4-trimethyl-1,3-pentanediol, 2,3-dimethyl-2,3-butanediol, and 1,4-cyclohexanediol.

Examples of diols containing an arylene group having the carbon number of 6 to 40 include dihydroxybenzenes, e.g., catechol, hydroquinone, and resorcinol; alkyl-substituted compounds, having the carbon number of 1 to 10, of the dihydroxybenzenes, e.g., methylhydroquinone and 2-methylresorcinol; dihydroxynaphthylenes; bisphenols, e.g., 1,1-bis(4-hydroxyphenyl)methane, 1,1-bis(4-hydroxyphenyl) ethane, 1,1-bis(4-methyl-2-hydroxyphenyl)methane, 1,1-bis (3,5-dimethyl-4-hydroxyphenyl)methane, 2,2-bis(4-hydroxyphenyl)-4-methylpentane, 1,1-bis(4-hydroxyphenyl)cyclohexane, 1,1-bis(4-hydroxyphenyl) cycloheptane, 1,1-bis(4-hydroxyphenyl)cyclooctane, 2,2-bis (4-hydroxyphenyl)propane, 2,2-bis(3-methyl-4-hydroxyphenyl)propane, 2,2-bis(3,5-dimethyl-4-hydroxyphenyl)propane, 1,1-bis(4-hydroxyphenyl)-1-phenylethane, 1,1-bis(4-hydroxyphenyl)-2-ethylhexane, 2,2-bis(3-phenyl-4-hydroxyphenyl)propane, 1,1-bis(3-methyl-4-hydroxyphenyl)methane, 4,4'-biphenol, 2,2-bis(4-hydroxyphenyl)butane, 1,1-bis(4-hydroxyphenyl)-2- methylpropane, 1,1-bis(4-hydroxyphenyl)-1-phenylmethane, 2,2-bis(4-hydroxyphenyl)octane, 1,1-bis(3-methyl-4-hydroxyphenyl)cyclohexane, 2,2-bis(3-allyl-4-hydroxyphenyl)propane, 2,2-bis(3-isopropyl-4-hydroxyphenyl)propane, 2,2-bis(3-tert-butyl-4-hydroxyphenyl)propane, 2,2-bis(3-secbutyl-4-hydroxyphenyl)propane, bisphenol fluorene, 1,1-bis(2-methyl-4-hydroxy-5-tert-butylphenyl)-2-methylpropane, 4,4'-[1,4-phenylene-bis(2-propylidene)]-bis(2-methylphenol), 1,1-bis(3-phenyl-4-hydroxyphenyl)cyclohexane, 4,4'-dihydroxyphenyl ether, 1,1-bis(2-hydroxyphenyl)methane, 2,4'-methylenebisphenol, 1,1-bis(3-methyl-4-hydroxyphenyl)methane, 1,1-bis(4-hydroxyphenyl)propane, 1,1-bis(2-hydroxy-5-methylphenyl)ethane, 1,1-bis(4-hydroxyphenyl)-3-methyl-butane, 1,1-bis(2-hydroxy-3,5-dimethylphenyl)methane, 1,1-bis(4-hydroxyphenyl)cyclopentane, 1,1-bis(3-methyl-4-hydroxyphenyl)cyclopentane, 3,3-bis(4-hydroxyphenyl)pentane, 3,3-bis(3-methyl-4-hydroxyphenyl)pentane, 3,3-bis(3,5-dimethyl-4-hydroxyphenyl)pentane, 2,2-bis(2-hydroxy-3,5-dimethylphenyl)propane, 2,2-bis(4-hydroxyphenyl)nonane, 1,1-bis(3-methyl-4-hydroxyphenyl)-1-phenylethane, 1,1-bis(3,5-dimethyl-4-hydroxyphenyl)cyclohexane, 2,2-bis(4-hydroxyphenyl)decane, 1,1-bis(4-hydroxyphenyl)decane, 0,1,1-bis(2-hydroxy-3-tert-butyl-5-methylphenyl)methane, 1,1-bis(4-hydroxyphenyl)diphenylmethane, terpene diphenol, 1,1-bis(3-tert-butyl-4-hydroxyphenyl)cyclohexane, 1,1-bis(2-methyl-4-hydroxy-5-tert-butylphenyl)-2-methylpropane, 2,2-bis(3-cyclohexyl-4-hydroxyphenyl)propane, 1,1-bis(3,5-ditert-butyl-4-hydroxyphenyl)methane, 1,1-bis(3,5-disecbutyl-4-hydroxyphenyl)methane, 1,1-bis(3-cyclohexyl-4-hydroxyphenyl)cyclohexane, 1,1-bis(2-hydroxy-3,5-ditert-butylphenyl)ethane, 1,1-bis(3-nonyl-4-hydroxyphenyl)methane, 2,2-bis(3,5-ditert-butyl-4-hydroxyphenyl)propane, 1,1-bis(2-hydroxy-3,5-ditert-butyl-6-methylphenyl)methane, 1,1-bis(3-phenyl-4-hydroxyphenyl)-1-phenylethane, 4,4-bis(4-hydroxyphenyl)pentanoic acid, bis(4-hydroxyphenyl)butyl acetate, 1,1-bis(3-fluoro-4-hydroxyphenyl)methane, 1,1-bis(2-hydroxy-5-fluorophenyl)methane, 2,2-bis(4-hydroxyphenyl)-1,1,1,3,3,3-hexafluoropropane, 2,2-bis(3-fluoro-4-hydroxyphenyl)propane, 1,1-bis(3-fluoro-4-hydroxyphenyl)-1-phenylmethane, 1,1-bis(3-fluoro-4-hydroxyphenyl)-1-(p-fluorophenyl)methane, 1,1-bis(4-hydroxyphenyl)-1-(p-fluorophenyl)methane, 2,2-bis(3-chloro-4-hydroxy-5-methylphenyl)propane, 2,2-bis(3,5-dichloro-4-hydroxyphenyl)propane, 2,2-bis(3-chloro-4-hydroxyphenyl)propane, 1,1-bis(3,5-dibromo-4-hydroxyphenyl)methane, 2,2-bis(3,5-dibromo-4-hydroxyphenyl)propane, 2,2-bis(3-nitro-4-hydroxyphenyl)propane, 3,3'-dimethyl-4,4'-biphenol, 3,3',5,5'-tetramethyl-4,4'-biphenol, 3,3',5,5'-tetratert-butyl-4,4'-biphenol, bis(4-hydroxyphenyl)ketone, 3,3'-difluoro-4,4'-biphenol, 3,3',5,5'-tetrafluoro-4,4'-biphenol, bis(4-hydroxyphenyl)dimethylsilane, bis(4-hydroxyphenyl)sulfone, bis(3-methyl-4-hydroxyphenyl)sulfone, bis(3,5-dimethyl-4-hydroxyphenyl)sulfone, bis(3,5-dibromo-4-hydroxyphenyl)sulfone, bis(4-hydroxyphenyl)thioether, bis(3-methyl-4-hydroxyphenyl)ether, bis(3-methyl-4-hydroxyphenyl)thioether, bis(3,5-dimethyl-4-hydroxyphenyl)ether, bis(3,5-dimethyl-4-hydroxyphenyl)thioether, 1,1-bis(2,3,5-trimethyl-4-hydroxyphenyl)-1-phenylmethane, 2,2-bis(4-hydroxyphenyl)dodecane, 2,2-bis(3-methyl-4-hydroxyphenyl)dodecane, 2,2-bis(3,5-dimethyl-4-hydroxyphenyl)dodecane, 1,1-bis(3-tert-butyl-4-hydroxyphenyl)-1-phenylethane, 1,1-bis(3,5-ditert-butyl-4-hydroxyphenyl)-1-phenylethane, 1,1-bis(2-methyl-4-hydroxy-5-cyclohexylphenyl)-2-methylpropane, 1,1-bis(2-hydroxy-3,5-ditert-butylphenyl)ethane, 2,2-bis(4-hydroxyphenyl)methyl propionate, 2,2-bis(4-hydroxyphenyl)ethyl propionate, isatinbisphenol, isatinbiscresol, 2,2',3,3',5,5'-hexamethyl-4,4'-biphenol, bis(2-hydroxyphenyl)methane, 2,4'-methylenebisphenol, 1,2-bis(4-hydroxyphenyl)ethane, 2-(4-hydroxyphenyl)-2-(2-hydroxyphenyl)propane, bis(2-hydroxy-3-allylphenyl)methane, 1,1-bis(2-hydroxy-3,5-dimethylphenyl)-2-methylpropane, 1,1-bis(2-hydroxy-5-tert-butylphenyl)ethane, bis(2-hydroxy-5-phenylphenyl)methane, 1,1-bis(2-methyl-4-hydroxy-5-tert-butylphenyl)butane, bis(2-methyl-4-hydroxy-5-cyclohexylphenyl)methane, 2,2-bis(4-hydroxyphenyl)pentadecane, 2,2-bis(3-methyl-4-hydroxyphenyl)pentadecane, 2,2-bis(3,5-dimethyl-4-hydroxyphenyl)pentadecane, 1,2-bis(3,5-ditert-butyl-4-hydroxyphenyl)ethane, bis(2-hydroxy-3,5-ditert-butylphenyl)methane, 2,2-bis(3-styryl-4-hydroxyphenyl)propane, 1,1-bis(4-hydroxyphenyl)-1-(p-nitrophenyl)ethane, bis(3,5-difluoro-4-hydroxyphenyl)methane, bis(3,5-difluoro-4-hydroxyphenyl)-1-phenylmethane, bis(3,5-difluoro-4-hydroxyphenyl)diphenylmethane, bis(3-fluoro-4-hydroxyphenyl)diphenylmethane, 2,2-bis(3-chloro-4-hydroxyphenyl)propane, 3,3',5,5'-tetratert-butyl-2,2'-biphenol, 2,2'-diallyl-4,4'-biphenol, 1,1-bis(4-hydroxyphenyl)-3,3,5-trimethyl-cyclohexane, 1,1-bis(4-hydroxyphenyl)-3,3,5,5-tetramethyl-cyclohexane, 1,1-bis(4-hydroxyphenyl)-3,3,4-trimethyl-cyclohexane, 1,1-bis(4-hydroxyphenyl)-3,3-dimethyl-5-ethyl-cyclohexane, 1,1-bis(4-hydroxyphenyl)-3,3,5-trimethyl-cyclopentane, 1,1-bis(3,5-dimethyl-4-hydroxyphenyl)-3,3,5-trimethyl-cyclo hexane, 1,1-bis(3,5-diphenyl-4-hydroxyphenyl)-3,3,5-trimethyl-cyclohexane, 1,1-bis(3-methyl-4-hydroxyphenyl)-3,3,5-trimethyl-cyclohexane, 1,1-bis(3-phenyl-4-hydroxyphenyl)-3,3,5-trimethyl-cyclohexane, 1,1-bis(3,5-dichloro-4-hydroxyphenyl)-3,3,5-trimethyl-cyclohexane, 9,9-bis(4-hydroxyphenyl)fluorene, 9,9-bis(3,5-dimethyl-4-hydroxyphenyl)fluorene, 1,1-bis(3,5-dibromo-4-hydroxyphenyl)-3,3,5-trimethyl-cyclohexane, α,α-bis(4-hydroxyphenyl)-1,4-diisopropylbenzene, 1,1-bis(4-hydroxyphenyl)-4-methylcyclohexane, 1,1-bis(4-hydroxyphenyl)-4-isopropylcyclohexane, 2,2-bis(4-hydroxyphenyl)-4-methylpentane, 1,1-bis(3-methyl-4-hydroxyphenyl)-4-isopropylcyclohexane, 1,1-bis(2-methyl-4-hydroxy-5-tert-butylphenyl)-1-isopropylmethane, 1,1-bis(2-methyl-4-hydroxy-5-cyclohexylphenyl)-1-isopropylmethane, 1,1-bis(4-hydroxyphenyl)-4-butylcyclohexane, and 6,6'-dihydroxy-4,4,4',4',7,7'-hexamethyl-2,2', spirobichroman. These may be used alone or in combination. These diols can be used in accordance with the performance of the resulting polymer.

In the resin of the present invention, preferably, the content of the residue represented by General formula (2) is at least 0.5 percent by mole relative to the entire resin, further preferably is at least 5 percent by mole, and at least 10 percent by mole is particularly preferable.

The polymer of the present invention is not necessarily in the shape of a straight chain, and a polyhydric phenol may be copolymerized in accordance with the performance of the resulting polymer. Specific examples of the above-described polyhydric phenol include tris(4-hydroxyphenyl)methane, 4,4'-[1-[4-[1-(4-hydroxyphenyl)-1-methylethyl]phenyl]ethylidene]bisphenol, 2,3,4,4'-tetrahydroxybenzophenone, 4-[bis(4-hydroxyphenyl)methyl]-2-methoxyphenol, tris(3-methyl-4-hydroxyphenyl)methane, 4-[bis(3-methyl-4-hydroxyphenyl)methyl]-2-methoxyphenol, 4-[bis(3,5-dimethyl-4-hydroxyphenyl)methyl]-2-methoxyphenol, 1,1,1-tris(4-hydroxyphenyl)ethane, 1,1,1-tris(3-methyl-4- hydroxyphenyl)ethane, 1,1,1-tris(3,5-dimethyl-4-hydroxyphenyl)ethane, tris(3-methyl-4-hydroxyphenyl)methane, tris(3,5-dimethyl-4-hydroxyphenyl)methane, 2,6-bis[(2-hydroxy-5-methylphenyl)methyl]-4-methylphenol, 4-[bis(3,5-dimethyl-4-hydroxyphenyl)methyl]-1,2-dihydroxybenzene, 2-[bis(2-methyl-4-hydroxy-5-cyclohexylphenyl)methyl]-phenol, 4-[bis(2-methyl-4-hydroxy-5-cyclohexylphenyl)methyl]-1,2-dihydroxybenzene, 4-methylphenyl-1,2,3-trihydroxybenzene, 4-[(4-hydroxyphenyl)methyl]-1,2,3-trihydroxybenzene, 4-[1-(4-hydroxyphenyl)-1-methyl-ethyl]-1,3-dihydroxybenzene, 4-[(3,5-dimethyl-4-hydroxyphenyl)methyl]-1,2,3-trihydroxybenzene, 1,4-bis[1-bis(3,4-dihydroxyphenyl)-1-methyl-ethyl]benzene, 1,4-bis[1-bis(2,3,4-trihydroxyphenyl)-1-methyl-ethyl]benzene, 2,4-bis[(4-hydroxyphenyl)methyl]-1,3-dihydroxybenzene, 2-[bis(3-methyl-4-hydroxyphenyl)methyl]phenol, 4-[bis(3-methyl-4-hydroxyphenyl)methyl]phenol, 2-[bis(2-methyl-4-hydroxyphenyl)methyl]phenol, 4-[bis(3-methyl-4-hydroxyphenyl)methyl]-1,2-dihydroxybenzene, 4-[bis(4-hydroxyphenyl)methyl]-2-ethoxyphenol, 2-[bis(2,3-dimethyl-4-hydroxyphenyl)methyl]phenol, 4-[bis(3,5-dimethyl-4-hydroxyphenyl)methyl]phenol, 3-[bis(3,5-dimethyl-4-hydroxyphenyl)methyl]phenol, 2-[bis(2-hydroxy-3,6-dimethylphenyl)methyl]phenol, 4-[bis(2-hydroxy-3,6-dimethylphenyl)methyl]phenol, 4-[bis(3,5-dimethyl-4-hydroxyphenyl)methyl]-2-methoxyphenol, 3,6-[bis(3,5-dimethyl-4-hydroxyphenyl)methyl]-1,2-dihydroxybenzene, 4,6-[bis(3,5-dimethyl-4-hydroxyphenyl)methyl]-1,2,3-trihydroxybenzene, 2-[bis(2,3,6-trimethyl-4-hydroxyphenyl)methyl]phenol, 2-[bis(2,3,5-trimethyl-4-hydroxyphenyl)methyl]phenol, 3-[bis(2,3,5-trimethyl-4-hydroxyphenyl)methyl]phenol, 4-[bis(2,3,5-trimethyl-4-hydroxyphenyl)methyl]phenol, 4-[bis(2,3,5-trimethyl-4-hydroxyphenyl)methyl]-1,2-dihydroxybenzene, 3-[bis(2-methyl-4-hydroxy-5-cyclohexylphenyl)methyl]phenol, 4-[bis(2-methyl-4-hydroxy-5-cyclohexylphenyl)methyl]phenol, 4-[bis(2-methyl-4-hydroxy-5-cyclohexylphenyl)methyl]-2-methoxyphenol, 2,4,6-[tris(4-hydroxyphenyl)methyl]-1,3-dihydroxybenzene, 1,1,2,2-tetra(3-methyl-4-hydroxyphenyl)ethane, 1,1,2,2-tetra(3,5-dimethyl-4-hydroxyphenyl)ethane, 1,4-[bis(4-hydroxyphenyl)methyl]benzene, 1,4-di[bis(3-methyl-4-hydroxyphenyl)methyl]benzene, 1,4-di[bis(3,5-dimethyl-4-hydroxyphenyl)methyl]benzene, 4-[1,1-bis(4-hydroxyphenyl)ethyl]aniline, (2,4-dihydroxyphenyl)(4-hydroxyphenyl)ketone, 2-[bis(4-hydroxyphenyl)methyl]phenol, and 1,3,3-tri(4-hydroxyphenyl)butane. These may be used alone or in combination.

The monomer used as a component copolymerized with the above-described diol component and the component which provides the residue represented by General formula (1) is, for example, a divalent carboxylic acid, a divalent sulfonic acid, a divalent dialkyl phosphate, a divalent dialkyl phosphite, phosphonic acid, phosphonous acid, or a derivative of the above-described acid component or a derivative of carbonate (a derivative of the acid or a derivative of the carbonate to be used is a halogenated compound, an acid anhydride, an ester, or the like thereof, although not specifically limited.), and preferably, a phosphonic acid derivative, a phosphonous acid derivative, or a carbonate derivative is adopted. The above-described copolymerization components are used alone or in combination.

A compound suitable for the copolymerization is a compound which provides the residue represented by General formula (3):

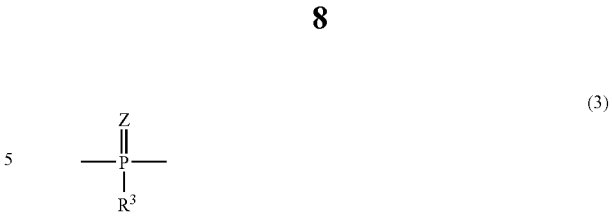

where, in General formula (3), $R^3$ represents a functional group selected from the group consisting of an aliphatic group having the carbon number of 1 to 20, an alicyclic group, an aromatic group, a halogen-substituted aromatic group, a hydroxyl group, an alkoxy group, and a phenoxy group, and Z represents oxygen, sulfur, selenium, or an unshared electron pair. The resin may contain different types of $R^3$ and/or Z serving as substituents.

Specific examples of the substituent $R^3$ on a phosphorous atom represented by General formula (3) include phenyl, halogen-substituted phenyl, methoxyphenyl, ethoxyphenyl, alkyl, e.g., ethyl, isopropyl, and cyclohexyl, vinyl, allyl, benzyl, aminoalkyl, hydroxyalkyl, halogen-substituted alkyl, and alkylsulfide groups. Specific examples of phosphonic acids which provides these phosphonic acid residues of General formula (3) include methylphosphonic acid, ethylphosphonic acid, n-propylphosphonic acid, isopropylphosphonic acid, n-butylphosphonic acid, isobutylphosphonic acid, t-butylphosphonic acid, n-pentylphosphonic acid, neopentylphosphonic acid, cyclohexylphosphonic acid, benzylphosphonic acid, chloromethylphosphonic acid, dichloromethylphosphonic acid, bromomethylphosphonic acid, dibromomethylphosphonic acid, 2-chloroethylphosphonic acid, 1,2-dichloroethylphosphonic acid, 2-bromoethylphosphonic acid, 1,2-dibromoethylphosphonic acid, 3-chloropropylphosphonic acid, 2,3-dichloropropylphosphonic acid, 3-bromopropylphosphonic acid, 2,3-dibromopropylphosphonic acid, 2-chloro-1-methylethylphosphonic acid, 1,2-dichloro-1-methylethylphosphonic acid, 2-bromo-1-methylethylphosphonic acid, 1,2-dibromo-1-methylethylphosphonic acid, 4-chlorobutylphosphonic acid, 3,4-dichlorobutylphosphonic acid, 4-bromobutylphosphonic acid, 3,4-dibromobutylphosphonic acid, 3-chloro-1-methylpropylphosphonic acid, 2,3-dichloro-1-methylpropylphosphonic acid, 3-bromo-1-methylpropylphosphonic acid, 2,3-dibromo-1-methylphosphonic acid, 1-chloromethylpropylphosphonic acid, 1-chloro-1-chloromethylpropylphosphonic acid, 1-bromomethylpropylphosphonic acid, 1-bromo-1-bromomethylpropylphosphonic acid, 5-chloropentylphosphonic acid, 4,5-dichloropentylphosphonic acid, 5-bromopentylphosphonic acid, 4,5-dibromopentylphosphonic acid, 1-hydroxymethylphosphonic acid, 2-hydroxyethylphosphonic acid, 3-hydroxypropylphosphonic acid, 4-hydroxybutylphosphonic acid, 5-hydroxypentylphosphonic acid, 1-aminomethylphosphonic acid, 2-aminoethylphosphonic acid, 3-aminopropylphosphonic acid, 4-aminobutylphosphonic acid, 5-aminopentylphosphonic acid, methylthiomethylphosphonic acid, methylthioethylphosphonic acid, methylthiopropylphosphonic acid, methylthiobutylphosphonic acid, ethylthiomethylphosphonic acid, ethylthioethylphosphonic acid, ethylthiopropylphosphonic acid, propylthiomethylphosphonic acid, propylthioethylphosphonic acid, butylthiomethylphosphonic acid, phenylphosphonic acid, 4-chlorophenylphosphonic acid, 3,4-dichlorophenylphosphonic acid, 3,5-dichlorophenylphosphonic acid, 4-bromophenylphosphonic acid, 3,4-dibromophenylphosphonic acid, 3,5-dibromophenylphosphonic acid, 4-methoxyphenylphosphonic acid, 3,4-dimethoxyphenylphosphonic acid, 1-naphthylphosphonic acid, 2-naphthylphosphonic acid, benzylphosphonic acid, 4-bromophenylmethylphosphonic acid, 3,4-dibromophenylmethylphosphonic acid, 3,5-dibromophenylmethylphosphonic acid, 2-phenylethylphosphonic acid, 2-(4-bromophenyl)ethylphosphonic acid, 2-(3,4-dibromophenyl)ethylphosphonic acid, 2-(3,5-dibromophenyl)ethylphosphonic acid, 3-phenylpropylphosphonic acid, 3-(4-bromophenyl)propylphosphonic acid, 3-(3,4-dibromophenyl)propylphosphonic acid, 3-(3,5-dibromophenyl)propylphosphonic acid, 4-phenylbutylphosphonic acid, 4-(4-bromophenyl)butylphosphonic acid, 4-(3,4-dibromophenyl)butylphosphonic acid, 4-(3,5-dibromophenyl)butylphosphonic acid, 2-pyridylphosphonic acid, 3-pyridylphosphonic acid, 4-pyridylphosphonic acid, 1-pyrrolidinomethylphosphonic acid, 1-pyrrolidinoethylphosphonic acid, 1-pyrrolidinopropylphosphonic acid, 1-pyrrolidinobutylphosphonic acid, pyrrole-1-phosphonic acid, pyrrole-2-phosphonic acid, pyrrole-3-phosphonic acid, thiophene-2-phosphonic acid, thiophene-3-phosphonic acid, dithiane-2-phosphonic acid, trithiane-2-phosphonic acid, furan-2-phosphonic acid, furan-3-phosphonic acid, vinylphosphdnic acid, allylphosphonic acid, and 2-norbornylphosphonic acid. Likewise, thiophosphonic acids in which sulfur atoms have substituted for oxygen atoms bonded to these phosphorous atoms by double bonds are included. These can be used alone or in combination.

These phosphonic acids may be phosphonic acid derivatives, e.g., acid chlorides, esters, and amides thereof.

In these phosphonic acid residues, it is preferable that Z is an unshared electron pair since the resin can be provided with the oxidation resistance. However, excessive unshared electron pairs may adversely affect the stability of properties, e.g., optical properties. Therefore, preferably, the proportion of unshared electron pairs relative to Z in the total molecules of the resin is 50 percent by mole or less, more preferably is 25 percent by mole or less, and further preferably is 10 percent by mole or less.

Another compound suitable for the copolymerization component is a compound which provides the residue represented by General formula (4):

(4)

Examples of the above-described compound include phosgene, triphosgene, dialkyl carbonates (dimethyl carbonate, diethyl carbonate, diphenyl carbonate, and the like), and polycarbonates (including oligomers and ring-shaped compounds).

When a compound which provides a structural unit represented by General formula (3) or General formula (4) is used, preferably, the range of amount thereof satisfies the following Formula (I):

$$0.01 \leq ((a)/((a)+(b)+(c))) < 1 \qquad (I)$$

where (a), (b), and (c) represent the numbers of moles of the residues corresponding to General formula (1), General formula (3), and General formula (4), respectively.

In Formula (I), when the value is less than 0.01, the contribution of the polymer to the heat resistance is small and, therefore, it is difficult to exert the effect of the present invention. Preferably, the range is $0.1 \leq ((a)/\{(a)+(b)+(c)\}) < 1$.

In the resin of the present invention, resins and additives other than the above-described resin may be blended as long as the object of the present invention is not impaired. Examples of such a resin include polyethylenes, polypropylenes, polystyrenes, ABS resins, polymethyl methacrylates, polytrifluoroethylenes, polytetrafluoroethylenes, polyacetals, polyphenylene oxides, polybutylene terephthalates, polyethylene terephthalates, polyamides, polyimides, polyamide imides, polyetherimides, polysulfones, polyether sulfones, paraoxybenzoyl-based polyesters, polyarylates, and polysulfides. With respect to additives, various antioxidants of hindered phenol base, hindered amine base, thioether base, and phosphorous base can be added to the resin.

On the other hand, in general, the Abbe number is used as the index representing the degree of dispersion of light of the optical substance, and is calculated based on the following Formula (II):

$$\text{Abbe number } (\nu d) = (nd-1)/(nf-nc) \qquad (II)$$

(where nd: d-line (wavelength 587.6 nm) refractive index, nf: f-line (wavelength 486.1 nm) refractive index, nc: c-line (wavelength 656.3 nm) refractive index).

That is, a larger value thereof indicates lower dispersion.

In general, there is a negative correlation between the Abbe number and the refractive index, and it is not easy to improve both the two properties simultaneously. The resin of the present invention has a high Abbe number while having a refractive index higher than that of the known polycarbonate. Preferably, the Abbe number of a resin used for a spectacle lens, for example, is at least 30, and more preferably is at least 31.

Preferably, the d-line refractive index is at least 1.57, and more preferably is at least 1.58.

When a film of 100 μm in thickness is produced from the resin of the present invention, the total light transmittance is at least 50% and the yellowness index is 30 or less, preferably, the total light transmittance is at least 70% and the yellowness index is 20 or less, and it is particularly preferable that the total light transmittance is at least 80% and the yellowness index is 10 or less.

The total light transmittance and the yellowness index are defined as described below. Tristimulus values (X, Y, Z) of a sample are determined by a transmission method with a digital color computer (SM-7CH: manufactured by Suga Test Instruments Co., Ltd.). The total light transmittance is defined as the value of Y. With respect to the yellowness index (ΔYI), the sample is set and X, Y, and Z are determined, and the YI value (YI$_2$) is determined based on Formula (III). Subsequently, X, Y, and Z are determined in a similar manner under the condition in which the sample is taken off, a reference value YI$_1$ is determined in a similar manner, and the yellowness index (ΔYI) is calculated based on Formula (IV).

$$YI = 100 \times (1.28X - 1.06Z)/Y \qquad (III)$$

X, Y, and Z: tristimulus values of the sample with respect to the standard light C $$\Delta YI = YI_2 - YI_1 \qquad (IV)$$

ΔYI: yellowness index

YI$_1$: reference value

YI$_2$: measurement value of the sample

The total light transmittance of films and sheets having various thicknesses can be converted to the total light transmittance of films having a thickness of 100 μm by application of the Lambert-Beer law.

A method for manufacturing the resin of the present invention will be described below with reference to the examples. As a matter of course, the present invention is not limited to such a description.

A method for manufacturing a polyphosphate is disclosed in U.S. Pat. No. 3,159,602. This method is solid melt polymerization with no solvent, or solution polymerization by the use of dimethylformamide or dimethylacetamide. With respect to the melt polymerization, the reaction proceeds heterogeneously, and it is difficult to produce a high molecular weight substance. In both polymerization methods, since the polymerization is performed at a high temperature of at least 170° C., there are also problems in that an increase of molecular weight is hindered and coloring occurs due to side reactions. Therefore, the molecular weight of the polyphosphate having a spiro ring, produced by the above-described method, is low, and the use of the product as a molded material is difficult.

A method for manufacturing the polyphosphate having a spiro ring is disclosed in Japanese Unexamined Patent Application Publication No. 2000-290288. In that method as well, the average degree of polymerization is less than 4 and, therefore, the product is a less-than-high molecular weight substance. Furthermore, the purpose described in the document is the use as a flame retardant, and the heat resistance and the optical properties are not disclosed.

The polymerization of polyphosphate prepared by polycondensation of the phosphate having a spiro ring and bisphenol A is described in Polymeric Materials Science and Engineering, vol. 74, pages 147 to 148, 1996. In the document, it is described that a high molecular weight substance is prepared, but the number average molecular weight is not specifically described. The inventors of the present invention re-created the experiment in the document and, as a result, the number average molecular weight was 700. It is believed that preparation of any high molecular weight substance is difficult because the concentration of dihydric phenol unit in the solution is a low 0.02 mol/L. The polyphosphate in that document is used for improving flame retardancy as well. The molecular weight is relatively high from the viewpoint of the use for improvement of flame retardancy. However, the molecular weight is low compared with that of the resin of the present invention and the use of the product as a molded material or a film is difficult.

That is, all the above-described disclosed polyphosphates including a Spiro ring have low molecular weights, and are used simply for improving the flame retardant effect by being blended with other resins, so that the polyphosphates are fundamentally different from the present invention.

The inventors of the present invention conducted intensive research and, as a result, succeeded in preparing a high molecular weight substance by polycondensation at a low temperature in sulfolane or a halogen-based solvent, so that the method for manufacturing a polyphosphate of the present invention has been achieved. In the known method, the polymerization is performed at a high temperature. However, when high temperature polymerization is performed in a polar solvent, side reactions accompany the polymerization, and hinder an increase of the molecular weight. In the case of melt polymerization without using any organic solvent or high temperature polymerization by the use of a non-reactive organic solvent (Japanese Unexamined Patent Application Publication No. 2000-290288) as well, although the degree of polymerization is increased, the molecular weight is insufficient for a molded material. In the present invention, the resin is made to have a high molecular weight by the use of a non-reactive polar solvent, that is, sulfolane or a halogen-based solvent, at a low temperature.

An example of the method for manufacturing the resin of the present invention will be described. A monomer, e.g., SUPOC, which provides a divalent phosphate residue having a spiro ring, represented by the above-described General formula (1), and a dihydric phenol component are mixed and reacted in sulfolane or a halogen-based solvent at 100° C. or less in the presence of a base, e.g., triethylamine, so that the resin of the present invention can be prepared by polycondensation. The organic solvent to be used is sulfolane or a halogen-based solvent (specific examples thereof include halogenated aliphatic hydrocarbons, e.g., methylene chloride and dichloroethane), and preferably is sulfolane or dichloromethane. Preferably, the polymerization is performed at a polymerization temperature of 100° C. or less from the viewpoint of coloring and side reactions. More preferably, the polymerization temperature is 60° C. or less, and 30° C. or less is particularly preferable.

In the case of copolymerization, a monomer which provides a divalent phosphate residue having a spiro ring, represented by the above-described General formula (1), and a dihydric phenol component are mixed and reacted in the presence of a base, e.g., triethylamine, and thereafter, for example, a precursor molecule of a phosphonic acid residue, e.g., a phosphonic acid-derivative, or a precursor molecule of a carbonate residue, e.g., triphosgene, is added and polycondensation is performed, so that the resin can be prepared. The dihydric phenol component in the manufacturing method of the present invention refers to a dihydric phenol monomer and a dihydric phenol residue.

In the manufacturing method of the present invention, during the polymerization reaction following the addition of the monomer which provides a divalent phosphate residue having a spiro ring, the concentration of the dihydric phenol component in the system is very important for the yield and the degree of polymerization. Preferably, the reaction is performed while the concentration of the dihydric phenol component is maintained to be at least 0.1 mol/L, and further preferably be at least 0.2 mol/L. Here, the concentration of the dihydric phenol component is defined as:

(the number of moles of dihydric phenol component (mol))/(volume of solvent (L)).

Furthermore, in order to prepare a higher molecular weight substance, preferably, the following method is used. That is, in an organic solvent, copolymerization components which provide residues other than that represented by General formula (1) (for example, a component which provides a phosphonic acid residue or a carbonate residue and a diol component) are mixed in the presence of a base, e.g., triethylamine, and are polycondensated beforehand to increase the solubility in the solvent. Subsequently, a component (for example, SUPOC) which provides a structural unit represented by General formula (1) is added, and polymerization is performed by continuing the polycondensation step, so that a high molecular weight polymer can be prepared appropriately. In another method, a part of copolymerization components which provide residues other than that represented by General formula (1) (for example, components which provide a phosphonic acid residue, a carbonate residue, and a diol residue) are mixed in the presence of a base, e.g., triethylamine, and are polycondensated beforehand. Subsequently, a component (for example, SUPOC) which provides a structural unit represented by General formula (1) is added, the polycondensation step is continued, and furthermore, the remaining copolymerization components which provide residues other than that represented by General formula (1) are added. By adopting this process, a further higher molecular weight substance can be prepared. Examples of divalent phosphate derivatives having a spiro ring and phosphonic acid derivatives include halogenated compounds, acid anhydrides, and esters thereof, and among them, halogenated compounds thereof are preferable. Examples of carbonate derivatives to be used include halogenated compounds, acid anhydrides, and esters thereof, although not specifically limited.

Preferably, the reaction is performed in the presence of the base serving as a reaction activator or a hydrogen chloride trapping agent. It is particularly preferable that organic bases, e.g., triethylamine, are used as the base to be used.

In the present invention, generally, phosgene or a phosgene derivative, e.g., triphosgene, is used when a carbonate group is introduced as the copolymerization component. However, since phosgene or a phosgene derivative is highly toxic and unstable in air, the handling is not easy. Since the compound is unstable, impurities may be generated due to decomposition, these impurities may cause coloring of the resin, and may hinder the molecular weight of the resin from being increased.

The inventors of the present invention conducted further intensive research and, as a result, found out that when carbonate polymers or oligomers of dihydric phenols were used as raw materials for carbonate residues, cracking of bonds thereof was readily effected by the dihydric phenol monomer in the presence of the base, e.g., triethylamine, and found out that, following the cracking reaction, the main chain was able to be extended by the monomer which provides a divalent phosphate residue having a spiro ring, represented by General formula (1), through the action of the high concentration monomer which provides a divalent phosphate residue having a spiro ring.

As described above, the high molecular weight substance was able to be further stably prepared by the use of carbonate polymers or oligomers of dihydric phenols to, introduce the carbonate groups without using phosgene nor phosgene derivative. Since impurities of phosgene derivatives were not present, the preparation of the resin having a high total light transmittance and a low yellowness index succeeded.

In the resin of the present invention, a carbonate polymer or oligomer of a dihydric phenol is used as a raw material constituting the carbonate residue. This polymer or oligomer is synthesized by a publicly known method. That is, examples of methods include a solution polymerization method, an interfacial polymerization method, and a melt polymerization method. Preferably, the melt polymerization method without using any toxic substance, e.g., phosgene, is used. In the melt polymerization method, an aromatic carbonate, an aliphatic carbonate, or the like is used as the raw material for the carbonate. The raw material is mixed with a dihydric phenol, and heat-melting is performed to effect transesterification, so that a desired carbonate polymer raw material can be prepared. At this time, a catalyst may be used for accelerating the reaction.

Subsequently, the carbonate polymer or oligomer of the dihydric phenol is reacted with the dihydric phenol monomer (reaction 1: cracking reaction) in the presence of the base. The reaction is performed in a solvent. Examples of preferable solvents include halogen-containing hydrocarbons, e.g., methylene chloride, ether-based solvents, e.g., tetrahydrofuran, and sulfone-based solvents, e.g., sulfolane. Examples of bases include organic bases, e.g., triethylamine.

Thereafter, a divalent phosphate derivative having a spiro ring is subjected to a reaction (reaction 2: polymerization reaction). At this time, the reaction product generated in the above-described reaction 1 may not be isolated and refined, and may be continuously subjected to the reaction with the divalent phosphate having a spiro ring. Preferably, the divalent phosphate derivative having a spiro ring is a halogenated compound of the divalent phosphate having a spiro ring, more preferably is a chloride of the divalent phosphate having a spiro ring. Specifically, SUPOC is most preferable. In the case where the molecular weight is further increased, a step of adding, for example, a phosphonic acid derivative, e.g., phenylphosphonic acid dichloride, or a divalent carboxylic acid derivative, e.g., terephthalic acid chloride or isophthalic acid chloride, is adopted following the reaction 2.

Preferably, the reaction with such a divalent phosphate having a spiro ring (reaction 2) is performed at a high concentration in terms of concentration of dihydric phenol unit, and in consideration that the reaction is continuously performed following the reaction 1, preferably, the reaction concentration in the stage of the reaction 1 is increased to a high concentration. In consideration that the reaction 1 and the reaction 2 are performed continuously, examples of solvents to be used include halogen-containing solvents, ether-based solvents, and sulfone-based solvents. The halogen-containing solvents are preferable, and halogenated aliphatic solvents, e.g., methylene chloride and dichloroethane, are particularly preferable. Preferably, the reaction is performed in the coexistence of a base serving as a reaction activator or a hydrogen chloride trapping agent. Preferably, the base to be used is similar to that used in the reaction 1, and in particular, organic bases, e.g., triethylamine, are used preferably. Although the reaction temperature depends on the solubility of the polymer in the solvent, a lower temperature is preferable in consideration of the molecular weight distribution, coloring, and the like. Preferably, the reaction temperature is 60° C. or less, and more preferably is 30° C. or less.

The method for manufacturing the resin can be applied to general bisphenols, e.g., bisphenol A, other bisphenols, and diols, and furthermore, be also applied to residues of dicarboxylic acids, e.g., terephthalic acid and isophthalic acid, instead of the carbonate residue.

The inventors of the present invention found out that a gut, plate, or film shaped molded material containing the resin of the present invention had excellent flame retardancy as well.

In general, the resin of the present invention has a high solubility in organic solvents. Examples of solvents include sulfolane, dimethyl sulfoxide, dimethylformamide (DMF), dimethylacetamide, N-methylpyrrolidone (NMP), methylene chloride, chloroform, 1,1,2,2-tetrachloroethane, 1,2-dichloroethane, γ-butyrolactone, isophorone, chlorobenzene, dichlorobenzene, bromobenzene, and hexafluoroisopropanol.

Furthermore, the polymer of the present invention is amorphous. Whether the polymer is amorphous is checked by a known method, e.g., differential scanning calorimetry (DSC) or dynamic viscoelasticity measurement, based on the presence or absence of the melting point.

In the case where the resin composition is prepared, various additives, e.g., other flame retardants, flame retardant assistants, elastomer components, stabilizers, ultraviolet absorbers, plasticizers, lubricants, and mold release agents; pigments; fillers; and other resins can be appropriately blended, if desired. Although known methods can be applied to the blending method, a method in which the resin and the additives are melt-kneaded, and are extruded is preferable.

The resin composition of the present invention can be used as a molded material in the machine, automobile, and food fields and, in addition, be preferably used as a material for forming a coating film (as a film by a melting method or a solvent casting method or as a binder of a coating solution or the like) in the electric and electronic fields and the optical apparatus fields.

The resin composition of the present invention has excellent heat resistance and transparency and, therefore, can be applied to watches, televisions, IC cards, word processors, personal computers, substrates of liquid crystal display portions and electroluminescence display portions in instrument panels and various display panels, transparent conductive films, surface protective films of optical disks and optical cards, and the like. The resin composition can be used as an alternative material to currently-used glass substrates and metal substrates through the use of the moldability, the heat resistance, and the high transparency.

With respect to the method for preparing molded materials, e.g., a lens, from the resin according to the present invention, known methods can be adopted, and is not specifically limited. Examples thereof include an injection molding method, a press molding method, a compression molding method, a transfer molding method, a lamination molding method, and an extrusion method.

In the case where the resin is molded into the shape of a film, examples of methods include a solution film forming method and a melt extrusion film forming method, and in particular, the solution film forming method is adopted preferably. In the solution film forming method, the above-described organic solvents can be used appropriately. However, sulfoxide-containing solvents and amide-containing solvents are preferable, and N-methylpyrrolidone is particularly preferable.

EXAMPLES

Specific embodiments of the present invention will be described below with reference to the examples, although the present invention is not limited to them. The evaluation of the resin was performed by the following methods.

[Molecular Weight]

The number average molecular weight was determined by an absolution calibration curve method through the use of a gel permeation chromatography (GPC) method. The measurement condition of GPC was as follows:

Apparatus: Waters 2690 (Waters Corporation)
Column: two columns of TSK-gel-α4000 and TSK-gel-α2500, produced by TOSOH CORPORATION, in series
Solvent: 10 mM lithium bromide-containing NMP flow=0.2 ml/min
Detector: UV
Sample: 0.1 percent by weight NMP solution
Amount of injection: 10 μl.

[Heat Resistance]

The glass transition point was measured with DSC (differential scanning calorimeter), and the value was used as the index of the heat resistance.
Apparatus: SSC5200 (produced by Seiko Instruments Inc.)
Sample: 10 mg
Temperature rising rate: 10° C./min.

[Optical Properties]

The resin was hot-press molded into the shape of a plate of 10 mm in width, 25 mm in length and 3 mm in thickness, and two surfaces, which are orthogonal to each other, of the resulting molding were polished with sandpaper and a buff to become mirror-finished. The evaluation was performed with a refractometer, and the Abbe number (vd), that was determined based on the d-line (wavelength: 587.6 nm) refractive index (nd) and Formula (II), was measured. Apparatus: KPR-2 (produced by KALNEW OPTICAL INDUSTRIAL CO., LTD.).

The total light transmittance and the yellowness index were measured as described below.

A film of 100 μm in thickness was formed from the resin by a solution casting method (NMP solution).

Tristimulus values (X, Y, Z) of the resulting sample were determined by a transmission method with a digital color computer (SM-7CH: manufactured by Suga Test Instruments Co., Ltd.). The value of Y itself was adopted as the total light transmittance. X, Y, and Z were determined under the condition in which the sample was set, and the YI value ($YI_2$) was determined based on Formula (III). Subsequently, X, Y, and Z were determined in a similar manner under the condition in which the sample was taken off, a reference value $YI_1$ was determined in a similar manner, and the ΔYI was calculated based on Formula (IV).

$$YI=100\times(1.28X-1.06Z)/Y \qquad (III)$$

X, Y, and Z: tristimulus values of the sample with respect to the standard light C $$\Delta YI=YI_2-YI_1 \qquad (IV)$$

ΔYI: yellowness index
$YI_1$: reference value
$YI_2$: measurement value of the sample.

The total light transmittance of films and sheets having various thicknesses can be converted to the total light transmittance of films having a thickness of 100 μm by applying the Lambert-Beer law.

[Phase Difference Property]

The resin was dissolved into methylene chloride, a film was formed on a glass plate, followed by drying, so that a cast film was prepared. With respect to the retardation (phase difference) measurement of the resulting film, the phase difference at a wavelength of 589 nm was measured with a cell gap inspection system.
Apparatus: RETS-1100 (produced by OTSUKA ELECTRONICS CO., LTD.)

[Mechanical Properties]

The resin was hot-press molded into the shape of a plate of 10 mm in width, 25 mm in length, and 3 mm in thickness, and the bending test was performed with Tensilon produced by K.K. Orienteck with a span length of 22 mm at a bending rate of 1.5 mm/min. The evaluation parameter was a toughness value (bending stress×fracture displacement) that was an index of brittleness.
Apparatus: RTM-100 (Tensilon produced by K.K. Orienteck).

Example 1

In a nitrogen atmosphere, 4,4'-dihydroxyphenyl ether (30 mmol) and triethylamine (63 mmol) were mixed in sulfolane (30 ml), and were agitated while being iced. A SUPOC (30 mmol) powder was put into the resulting solution, and agitation was performed for 30 minutes. Subsequently, sulfolane (15 ml) was put in, the temperature was adjusted to room temperature, and agitation was performed for 5 hours. The resulting reaction solution was blended with NMP (20 ml), and was put into 0.1 N hydrochloric acid aqueous solution (2 L). Reprecipitatation was performed, and a polymer was taken out by filtration. Thereafter, the resulting polymer was washed with water (2 L) and was dried, so that a targeted white resin powder was prepared quantitatively. The number average molecular weight was 17,700, and the glass transition point was 235° C.

Example 2

In a nitrogen atmosphere, 4,4'-dihydroxyphenyl ether (30 mmol) and triethylamine (63 mmol) were mixed in sulfolane (30 ml), and were agitated while being iced. A dichloromethane solution of triphosgene (0.584 M: 1.28 ml) was dropped to the resulting solution in over 5 minutes, and agitation was performed for 20 minutes. A SUPOC (22.5 mmol) powder was put in, and agitation was performed for 30 minutes. Subsequently, sulfolane (15 ml) was put in, the temperature was adjusted to room temperature, and agitation was performed for 1.5 hours. Furthermore, the dichloromethane solution of triphosgene (0.584 M: 3.00 ml) was dropped in over 15 minutes, the resulting reaction solution was blended with NMP (50 ml), and was put into 0.1 N hydrochloric acid aqueous solution (2 L). Reprecipitatation was performed, and a polymer was taken out by filtration. Thereafter, the resulting polymer was washed with water (2 L) and was dried, so that a targeted white resin powder was prepared with a yield of 99%. The number average molecular weight was 43,700, and the glass transition point was 216° C.

Example 3

In a nitrogen atmosphere, 1,1-bis(4-hydroxyphenyl)cyclohexane (50 mmol) and triethylamine (105 mmol) were mixed in dichloromethane (50 ml), and were agitated while being iced. A dichloromethane solution of triphosgene (0.557 M: 7.5 ml) was dropped to the resulting solution in over 20 minutes, and agitation was performed for 1 hour. Subsequently, a SUPOC (25 mmol) powder was put in, and agitation was performed for 2 hours and 30 minutes. Furthermore, the dichloromethane solution of triphosgene (0.557 M: 7.5 ml) was dropped in over 20 minutes, the temperature was adjusted to room temperature, and agitation was performed for 30 minutes. The resulting reaction solution was blended with 0.1 N hydrochloric acid aqueous solution (50 ml) so as to wash the organic layer. This operation was repeated 2 times. Water (50 ml) was further added to the resulting organic layer so as to wash the organic layer. This operation was repeated 2 times. The resulting organic layer was put into ethanol (2 L). Reprecipitatation was performed, and a polymer was taken out by filtration. Thereafter, the resulting polymer was dried, so that a targeted white resin powder was prepared with a yield of 80%. The number average molecular weight was 48,500, the glass transition point was 222° C., and the toughness value was 11.6 kgf/mm.

Example 4

In a nitrogen atmosphere, 1,1-bis(4-hydroxyphenyl)cyclohexane (30 mmol) and triethylamine (63 mmol) were mixed in sulfolane (40 ml), and were agitated while being iced. A dichloromethane solution of triphosgene (0.584 M: 2.14 ml) was dropped to the resulting solution in over 5 minutes, and agitation was performed for 20 minutes. Subsequently, a SUPOC (22.5 mmol) powder was put in, and agitation was performed for 1 hour. Thereafter, the temperature was adjusted to room temperature, and agitation was performed for 1.5 hours. Furthermore, the dichloromethane solution of triphosgene-(0.584 M: 2.14 ml) was dropped in over 5 minutes, and agitation was performed for 30 minutes. The resulting reaction solution was blended with NMP (50 ml), and was put into 0.1 N hydrochloric acid aqueous solution (2 L). Reprecipitatation was performed, and a polymer was taken out by filtration. Thereafter, the resulting polymer was washed with water (2 L) and was dried, so that a targeted white resin powder was prepared with a yield of 97%. The number average molecular weight was 22,100, the glass transition point was 238° C., and the toughness value was 17.3 kgf/mm. The retardation (phase difference) of the film having a film thickness of 75 µm was 1.61 nm (2.14 nm in terms of the retardation (phase difference) of the film having a film thickness of 100 am).

Example 5

In a nitrogen atmosphere, 4,4'-α-methylbenzylidene) bisphenol (30 mmol) and triethylamine (63 mmol) were mixed in sulfolane (40 ml), and were agitated while being iced. A dichloromethane solution of triphosgene (0.584 M: 2.14 ml) was dropped to the resulting solution in over 5 minutes, and agitation was performed for 20 minutes. Subsequently, a SUPOC (22.5 mmol) powder was put in, and agitation was performed for 1 hour. Thereafter, the temperature was adjusted to room temperature, and agitation was performed for 2 hours. Furthermore, the dichloromethane solution of triphosgene (0.584 M: 2.14 ml) was dropped in over 5 minutes, and agitation was performed for 30 minutes. The resulting reaction solution was blended with NMP (50 ml), and was put into 0.1 N hydrochloric acid aqueous solution (2 L). Reprecipitatation was performed, and a polymer was taken out by filtration. Thereafter, the resulting polymer was washed with water (2 L) and was dried, so that a targeted white resin powder was prepared with a yield of 97%. The number average molecular weight was 34,800, and the glass transition point was 238° C. The retardation (phase difference) of the film having a film thickness of 49 µm was 1.43 nm (2.92 nm in terms of the retardation (phase difference) of the film having a film thickness of 100 µm).

Example 6

In a nitrogen atmosphere, 1,1-bis(4-hydroxyphenyl)cyclohexane (22 mmol) and triethylamine (46.2 mmol) were mixed in dichloromethane (12 ml), and were agitated while being iced. A dichloromethane solution of triphosgene (0.584 M: 0.94 ml) was dropped to the resulting solution in over 5 minutes, and agitation was performed for 20 minutes. Subsequently, a SUPOC (5.5 mmol) powder was put in, and agitation was performed for 1 hour. Thereafter, a dichloromethane solution of phenylphosphonic acid dichloride (2.73 M: 4.03 ml) was dropped in over 15 minutes, and agitation was performed for 1 hour and 20 minutes. Furthermore, a dichloromethane solution of triphosgene (0.584 M: 2.20 ml) was dropped in over 5 minutes, the temperature was adjusted to room temperature, and agitation was performed for 30 minutes. The resulting reaction solution was blended with 0.1 N hydrochloric acid aqueous solution (100 ml) so as to wash the organic layer. This operation was repeated 2 times. Water (100 ml) was further added to the resulting organic layer so as to wash the organic layer. This operation was repeated 2 times. The resulting organic layer was put into ethanol (2 L). Reprecipitatation was performed, and a polymer was taken out by filtration. Thereafter, the resulting polymer was dried, so that a targeted white resin powder was prepared with a yield of 80%. The number average molecular weight was 38,600, the glass transition point was 180° C., and the toughness value was 40.0 kgf/mm. The retardation (phase difference) of the film having a film thickness of 119 µm was 2.62 nm (2.20 nm in terms of the retardation (phase difference) of the film having a film thickness of 100 μm), the refractive index nd was 1.594, and the Abbe number vd was 32.5.

Example 7

In a nitrogen atmosphere, 4,4'-α-methylbenzylidene)bisphenol (31.7 mmol), polycarbonate (C6BP-PC, 4 g), and triethylamine (70.4 mmol) were mixed in dichloromethane (18 ml), the vessel was immersed in a water bath, and agitation was performed for 3 hours. A SUPOC (27.4 mmol) powder was put into the resulting solution under icing, and agitation was performed for 1 hour and 20 minutes. Thereafter, the ice bath was taken off, and agitation was performed for 3 hours at room temperature. Subsequently, a mixed solution in which phenylphosphonic acid dichloride (4.6 mmol) was dissolved in dichloromethane (2 mL) was dropped in over 1 hour. While agitation was performed for 1 hour, 60 ml of methylene chloride in total was added at appropriate times in accordance with the viscosity. Acetic acid (5 mL) and methylene chloride (100 mL) were put into the resulting reaction solution, and agitation was performed for 10 minutes. Water (100 mL) was added to the resulting solution so as to wash, and this solution was subjected to reprecipitatation in large amounts of hot water at 70° C. The produced polymer was taken out by filtration, and the resulting polymer was dried, so that a targeted white resin powder was prepared with a yield of 95%. The number average molecular weight was 46,200, and the glass transition point was 223° C. A film of 100 μm in thickness was formed from the resulting resin by a solution casting method (NMP solution), and the total light transmittance and the yellowness index were measured by the above-described method. As a result, the total light transmittance was 88.7%, and the yellowness index was 1.93. The retardation (phase difference) of the film having a film thickness of 63 μm was 1.37 nm (2.18 nm in terms of the retardation (phase difference) of the film having a film thickness of 100 μm).

Example 8

In a nitrogen atmosphere, 1,1-bis(4-hydroxyphenyl)cyclohexane (C6BP, 31.7 mmol), polycarbonate (C6BP-PC, 4 g), and triethylamine (70.4 mmol) were mixed in dichloromethane (20 ml), the vessel was immersed in a water bath, and agitation was performed for 3 hours. A SUPOC (27.4 mmol) powder was put into the resulting solution under icing, and agitation was performed for 1 hour and 20 minutes. Thereafter, the ice bath was taken off, and agitation was performed for 3 hours at room temperature. Subsequently, a mixed solution in which phenylphosphonic acid dichloride (4.6 mmol) was dissolved in dichloromethane (2 mL) was dropped in over 1 hour. While agitation was performed for 1 hour, 60 ml of methylene chloride in total was added at appropriate times in accordance with the viscosity. Acetic acid (5 mL) and methylene-chloride (100 mL) were put into the resulting reaction solution, and agitation was performed for 10 minutes. Water (100 mL) was added to the resulting solution so as to wash, and this solution was subjected to reprecipitatation in large amounts of hot water at 70° C. The produced polymer was taken out by filtration, and the resulting polymer was dried, so that a targeted white resin powder was prepared with a yield of 95%. The number average molecular weight was 57,400, and the glass transition point was 223° C. A film of 100 μm in thickness was formed from the resulting resin by a solution casting method (NMP solution), and the total light transmittance and the yellowness index were measured by the above-described method. As a result, the total light transmittance was 89.5%, and the yellowness index was 2.30.

Example 9

In a nitrogen atmosphere, 2,2-bis(4-hydroxyphenyl)-4-methylpentane (31.7 mmol), polycarbonate (C6BP-PC, 4 g), and triethylamine (70.4 mmol) were mixed in dichloromethane (18 ml), the vessel was immersed in a water bath, and agitation was performed for 3 hours. A SUPOC (18.3 mmol) powder was put into the resulting solution under icing, and agitation was performed for 1 hour and 20 minutes. Thereafter, the ice bath was taken off, and agitation was performed for 2 hours at room temperature. Subsequently, a mixed solution in which phenylphosphonic acid dichloride (13.7 mmol) was dissolved in dichloromethane (5 mL) was dropped in over 1 hour. While agitation was performed for 1 hour, 40 ml of methylene chloride in total was added at appropriate times in accordance with the viscosity. Acetic acid (3 mL) and methylene chloride (100 mL) were put into the resulting reaction solution, and agitation was performed for 10 minutes. Water (100 mL) was added to the resulting solution so as to wash, and this solution was subjected to reprecipitatation in large amounts of hot water at 70° C. The produced polymer was taken out by filtration, and the resulting polymer was dried, so that a targeted white resin powder was prepared with a yield of 92%. The number average molecular weight was 39,200, the glass transition point was 165° C., the d-line refractive index was 1.57, and the Abbe number was 33.9. The retardation (phase difference) of the film having a film thickness of 55 μm was 1.95 nm (3.56 nm in terms of the retardation (phase difference) of the film having a film thickness of 100 μm).

When a film was formed from the resin described in the above-described embodiment by a solution film forming method, it was made sure that the resulting film had self sustainability and practical strength and elongation, and the film had a high total light transmittance and a small yellowness index.

When the resin described in the above-described embodiment was molded into a lens by a known method, it was made sure that the coloring was almost not obtrusive, and the lens was optically excellent.

Comparative Example 1

In a nitrogen atmosphere, 4,4'-dihydroxyphenyl ether (5 mmol) and triethylamine (10.5 mmol) were mixed in NMP (10 ml), and were agitated while being iced. A SUPOC (5 mmol) powder was put into the resulting solution, and agitation was performed for 1 hour and 30 minutes. Subsequently, the temperature was adjusted to room temperature, and agitation was performed for 5 hours. The resulting reaction solution was put into 0.1 N hydrochloric acid aqueous solution (500 ml). Reprecipitatation was performed, and a polymer was taken out by filtration. Thereafter, the resulting polymer was washed with water (500 ml) and was dried, so that a targeted resin powder was prepared with a yield of 99%. The number average molecular weight was 610.

Comparative Example 2

SUPOC (20 mmol), bisphenol A (60 mmol), anhydrous aluminum chloride (60 mg), and toluene (25 ml) were put into a reaction vessel provided with a heater, an agitator, a reflux tube, an introduction hole, and a thermometer, and the temperature was raised to 95° C. to 105° C. while agitation was performed. When the theoretical amount of hydrochloric acid gas was generated after a lapse of 1 hour and 30 minutes, cooling was performed. SUPOC (30 mmol) and anhydrous aluminum chloride (60 mg) were put into the resulting reaction liquid, and the temperature was raised again to 95° C. to 105° C. while agitation was performed. When the theoretical amount of hydrochloric acid gas was generated after a lapse of 3 hours, the reaction was terminated. The resulting reaction liquid was dropped to cooled ethyl acetate (100 ml) while agitation was performed, and precipitated white solids were recovered through filtration. Furthermore, washing was performed 2 times with acetone (100 ml) and, thereafter, vacuum drying was performed at room temperature for 16 hours, so that a targeted white solid substance was prepared with a yield of 78%. The number average molecular weight was 1,500.

Comparative Example 3

SUPOC (50 mmol) and bisphenol A (60 mmol) were put into a reaction vessel provided with a heater, an agitator, a reflux tube, an introduction hole, and a thermometer, and the temperature was raised to 170° C. while agitation was performed. After the agitation was performed for 30 minutes, the temperature was raised to 185° C. and agitation was performed for 3 hours. The temperature was further raised to 200° C., agitation was performed for 30 minutes, and the reaction was terminated. The resulting viscous reaction liquid was taken out while being at a high temperature, and was cooled, so that 21.6 g of product was prepared. The number average molecular weight was 500.

Comparative Example 4

In a nitrogen atmosphere, 4,4'-dihydroxyphenyl ether (5 mmol) and SUPOC (5 mmol) were mixed in DMF (10 ml). The temperature of the resulting solution was raised to 170° C., and agitation was performed for 5 hours. Thereafter, DMF and the generated hydrochloric acid were distilled off under a reduced pressure, so that an amber translucent solid was prepared with a yield of 95%. The number average molecular weight was 800.

Comparative Example 5

In a nitrogen atmosphere, bisphenol A (1 mmol) and triethylamine (1.44 mmol) were mixed in dichloromethane (50 ml). A SUPOC (1 mmol) powder was put into the resulting solution, the vessel was immersed in an oil bath at 50° C. while reflux was performed, and agitation was performed for 5 hours. Thereafter, water was added to the vessel so as to wash, dichloromethane in the organic layer was distilled off under a reduced pressure, and the polymer was dried, so that a targeted white resin powder was prepared with a yield of 90%. The number average molecular weight was 700.

Comparative Example 6

Commercially available polycarbonate: "TARFLON A2200" (produced by Idemitsu Petrochemical Co., Ltd.) was used, and was molded and evaluated by the above-described method. The refractive index nd was 1.583, and the Abbe number vd was 30.5.

Comparative Example 7

Commercially available polyallylate: "U polymer" (produced by UNITIKA LTD.) was used, and was made into a film and evaluated by the above-described method. The retardation (phase difference) of the film having a film thickness of 95 μm was 10.89 nm (16.59 nm in terms of the retardation (phase difference) of the film having a film thickness of 100 μm).

As is clear from Comparative examples, with respect to polymerization by the use of known methods, the number average molecular weights were less than 2,000 and, therefore, no film nor lens can be molded. Even when the molding was possible, since the molecular weight is low, the product cannot be put to practical use because of brittleness. On the other hand, the resin of the present invention has a high number average molecular weight (at least 2,000) and, therefore, can be used as a molding material and a film in machines, automobiles, electric and electronic fields, optical apparatus fields, and food fields. Furthermore, it is clear that the toughness value which is an index of the brittleness of the resulting molded material is large. The glass transition point is also high and, therefore, the resin is useful as a heat-resistant material. In addition, as is clear from Comparative examples, with respect to known typical thermoplastic resins, a highly refractive resin is highly dispersive, a low dispersive resin is low refractive and, therefore, the resins are significantly insufficient to be used for optical purposes, e.g., lenses. On the other hand, it is clear that the resin of the present invention has useful optical properties, e.g., high refraction and low dispersion. Since a typical transparent heat-resistant resin has many aromatic rings in a direction of the main chain, even an unstretched film has large retardation. On the other hand, it is clear that the resin of the present invention has small retardation since a spiro ring is included in the main chain. In addition, the total light transmittance is high and the yellowness index is low.

INDUSTRIAL APPLICABILITY

A highly heat-resistant thermoplastic resin having excellent optical properties and mechanical properties can be provided by increasing the molecular weight of a polymer including a phosphate group having spiro ring according to the present invention, and molded material and films made of this resin can be used in various fields.

The invention claimed is:

1. A resin comprising a polymer in which (A) a divalent structural unit having a spiro ring, represented by formula (1), is directly bonded to, (B) a diol residue, represented by formula (2), and which has a number average molecular weight of at least 17,700:

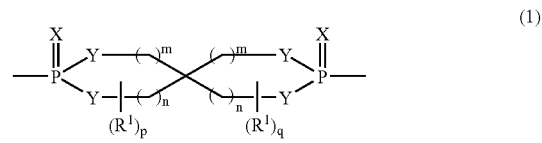

(1)

wherein $R^1$ is independently selected from the group consisting of a hydrogen atom, a halogen atom, an aliphatic hydrocarbon group having the carbon number of 1 to 20, an aromatic hydrocarbon group having the carbon number of 1 to 20, and a nitro group; p and q are integers satisfying p+q=0 to 16; X independently represents oxygen, sulfur or selenium; and Y is independently selected from oxygen, sulfur, and a methylene group; n and m are integers satisfying n+m=0 to 4; and $$-O-R^2-O- \qquad (2)$$

wherein $R^2$ represents an alicylene group having the carbon number of 2 to 20, or an arylene group having the carbon number of 6 to 40.

2. The resin according to claim 1, wherein at least 0.5 percent by mole of divalent phosphate residue having a spiro ring, represented by formula (1), is contained in a molecule of the polymer.

3. A molded material comprising the resin according to claim 1.

4. The resin according to claim 1, wherein the polymer comprises the residues represented by formulae (1) and (2) and (C) a structural unit represented by formula (3) and/or formula (4), and the mole fraction satisfies Formula (I):

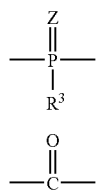

wherein $R^3$ represents a functional group selected from the group consisting of an aliphatic group having the carbon number of 1 to 20, an alicyclic group, an aromatic group, a halogen-substituted aromatic group, a hydroxyl group, an alkoxy group, and a phenoxy group, and Z represents oxygen, sulfur, selenium, or an unshared electron pair, $$0.01 \leq ((a)/((a)+(b)+(c))) < 1 \qquad (I)$$

where (a), (b), and (a) represent the numbers of moles of the structural units represented by formula (1), formula (3), and formula (4), respectively.

5. A resin composition comprising the resin according to claim 1 and other compounds, wherein the content of the divalent phosphate residue having a spiro ring, represented by formula (1), in the resin composition is at least 0.5 percent by mole.

6. The resin according to claim 1, wherein the d-line refractive index is at least 1.57.

7. The resin according to claim 1, wherein the Abbe number is at least 30.

8. The resin according to claim 1, wherein when the resin is made into a film of 100 μm in thickness, the total light transmittance is at least 50%, and the yellowness index ΔYI is 30 or less.

9. An optical lens comprising the resin according to claim 1.

10. A film comprising the resin according to claim 1.

11. A film substrate comprising the film according to claim 10 as a constituent material.

12. A method for manufacturing a resin containing a polymer in which (A) a divalent structural unit having a spiro ring, represented by formula (1), is directly bonded to (B) a diol residue, represented by formula (2), and which has a number average molecular weight of at least 17,700:

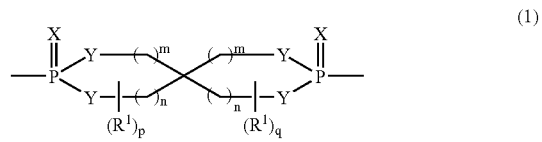

wherein $R^1$ is independently selected from the group consisting of a hydrogen atom, a halogen atom, an aliphatic hydrocarbon group having the carbon number of 1 to 20, an aromatic hydrocarbon group having the carbon number of 1 to 20, and a nitro group; p and q are integers satisfying p+q=0 to 16; X independently represents oxygen, sulfur or selenium; Y is independently selected from oxygen and sulfur; and n and m are integers satisfying n+m=0 to 4; and $$-O-R^2-O- \qquad (2)$$

wherein $R^2$ represents an alkylene group having the carbon number of 2 to 20, or an arylene group having the carbon number of 6 to 40;

the method comprising the step of polycondensing a monomer which provides a divalent structural unit having a spiro ring, represented by formula (1), and a diol which provides a diol residue, represented by formula (2), in sulfolane and/or a halogen-based solvent at 100° C. or less.

* * * * *